Sept. 24, 1940.  W. F. GROENE ET AL  2,215,922
POWER CHUCKING MECHANISM
Filed Oct. 6, 1939  8 Sheets-Sheet 6
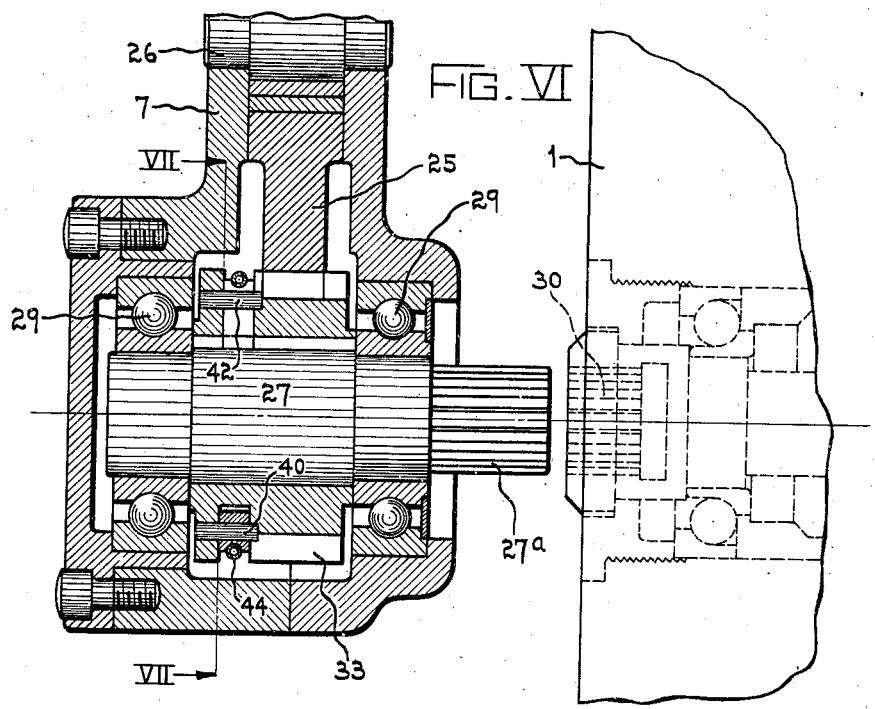
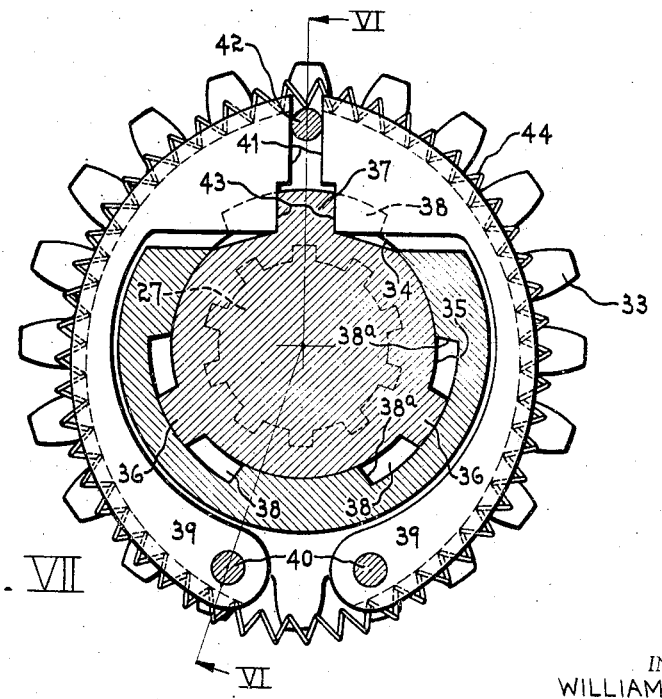
INVENTORS.
WILLIAM F. GROENE
HAROLD J. SIEKMANN
BY
ATTORNEY.

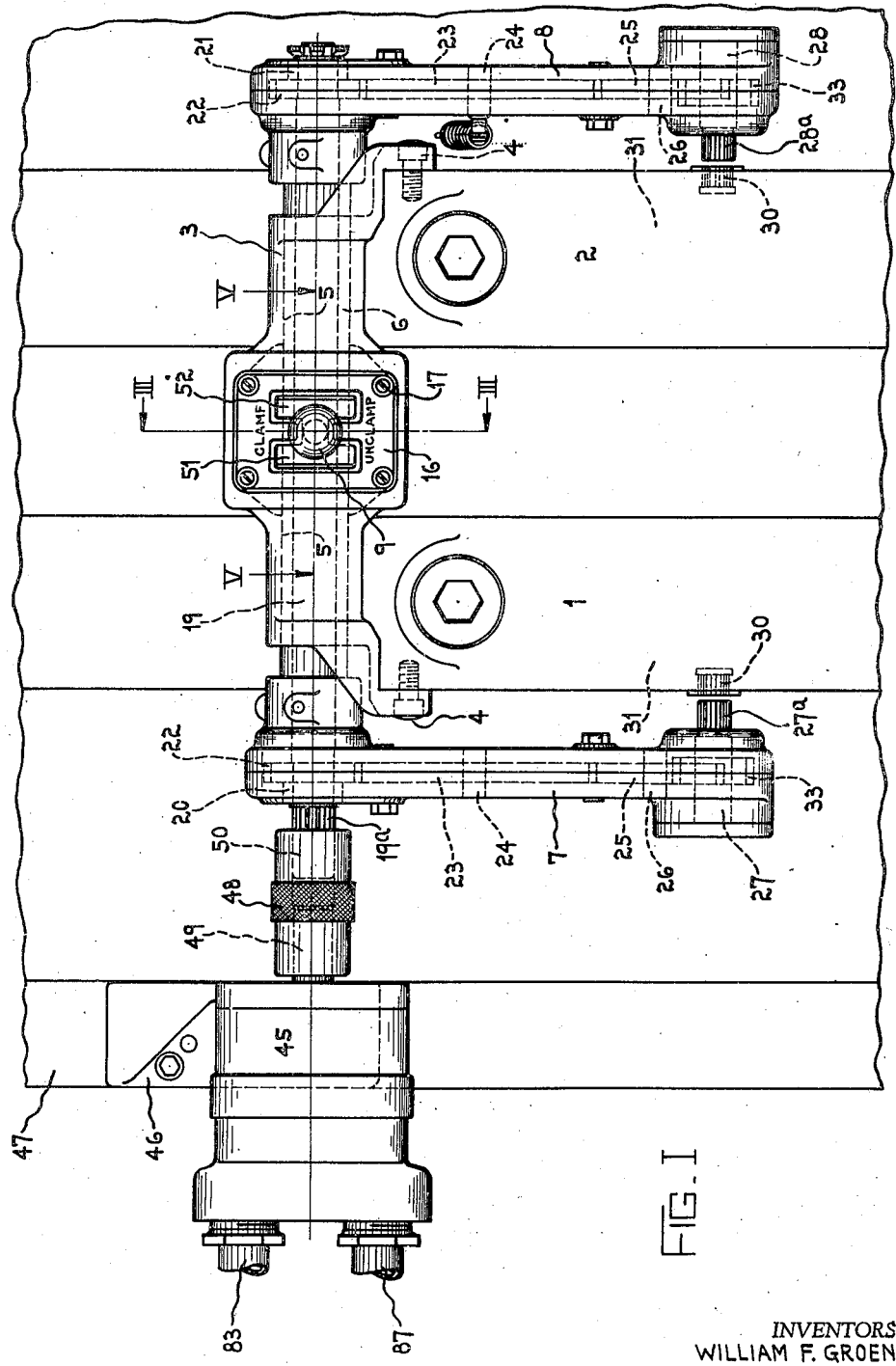
FIG. I
INVENTORS.
WILLIAM F. GROENE
HAROLD J. SIEKMANN
BY Willard L. Groene
ATTORNEY.

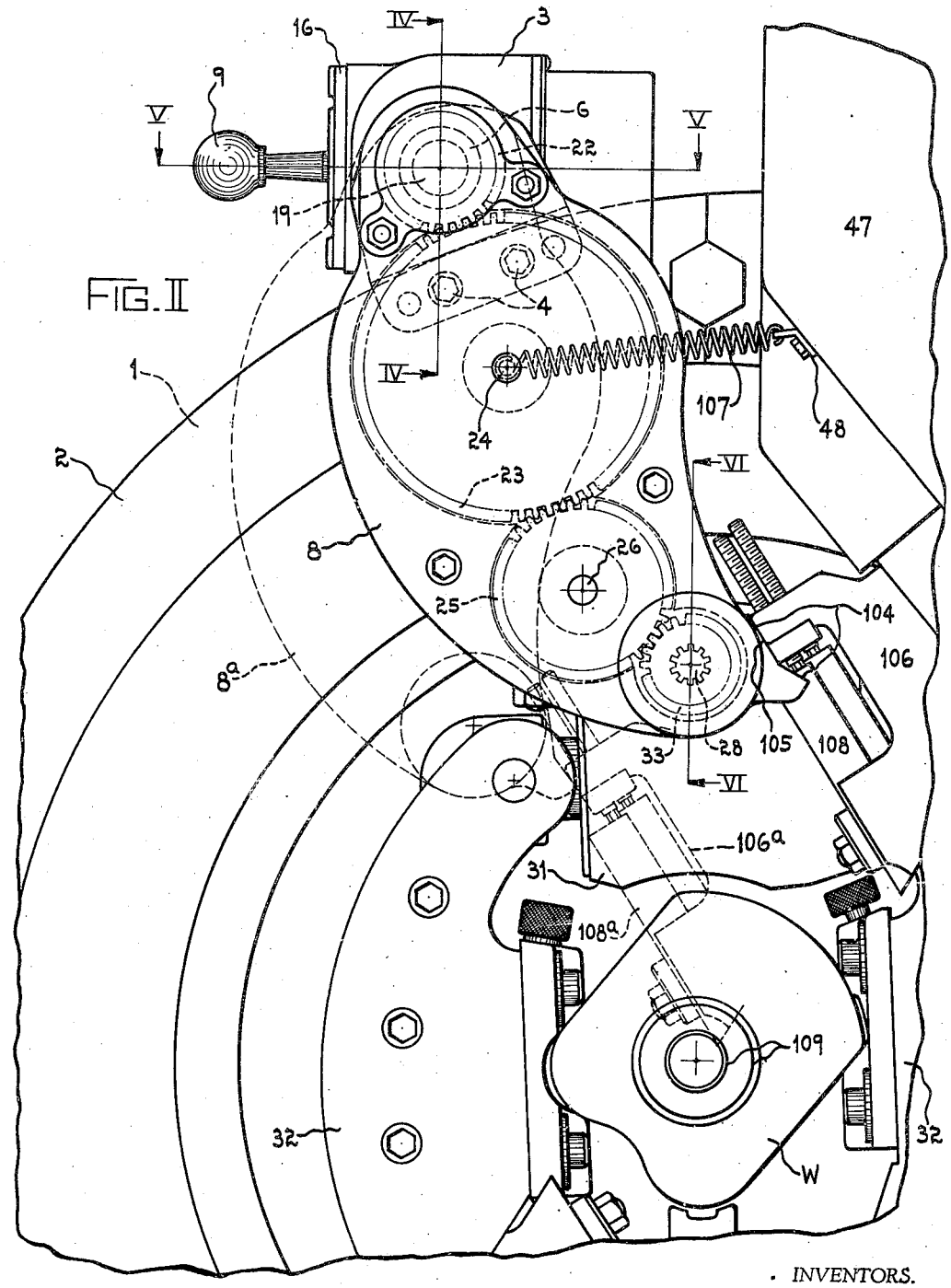

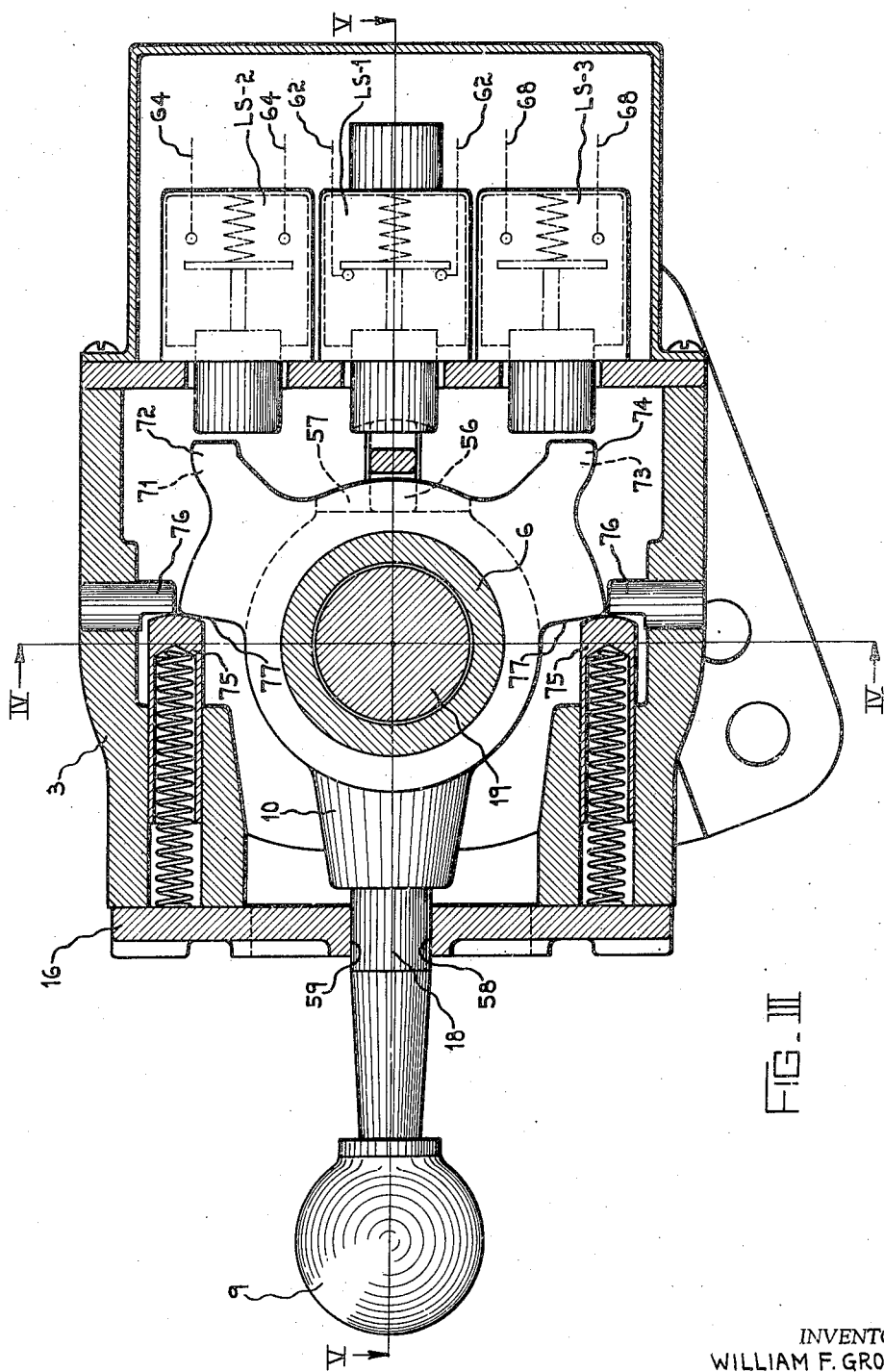

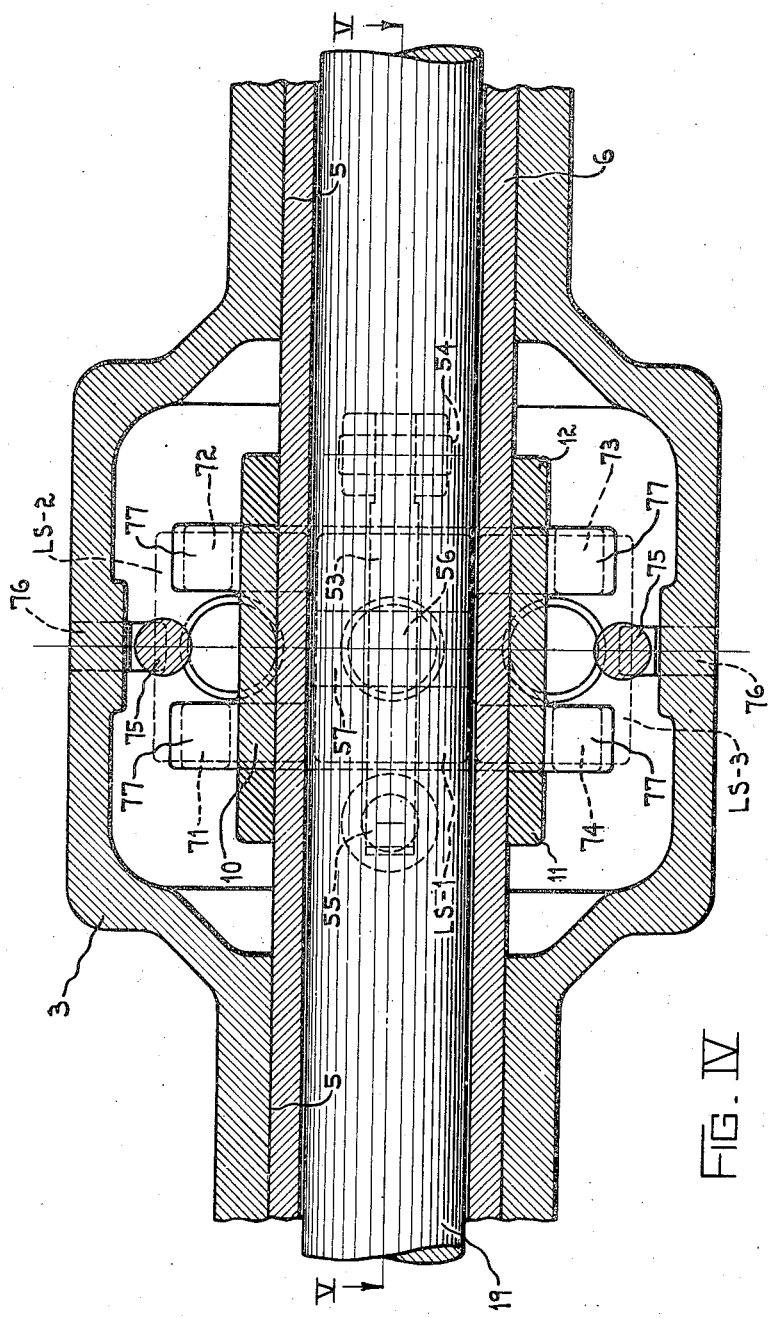

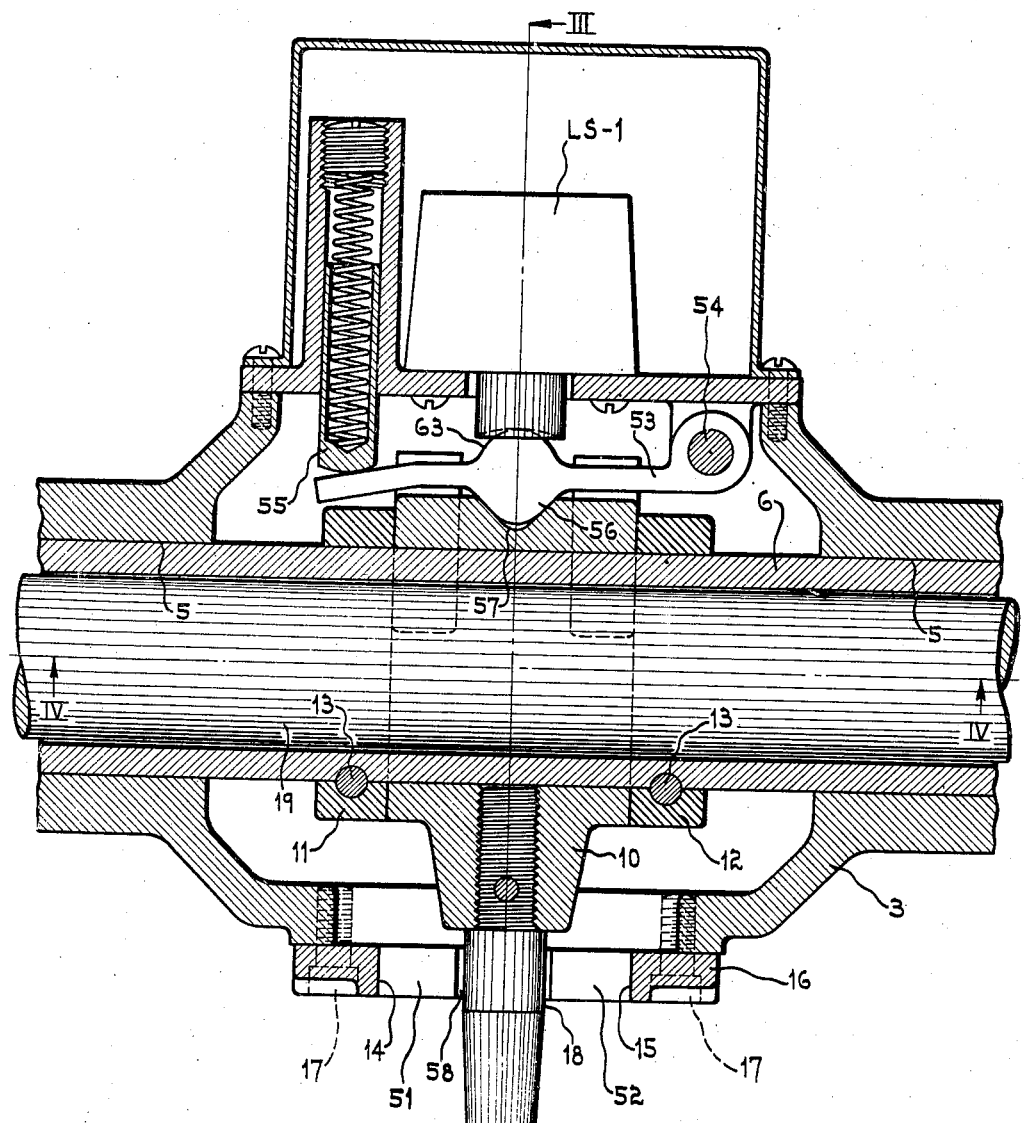
FIG. V

Sept. 24, 1940.   W. F. GROENE ET AL   2,215,922
POWER CHUCKING MECHANISM
Filed Oct. 6, 1939   8 Sheets-Sheet 7
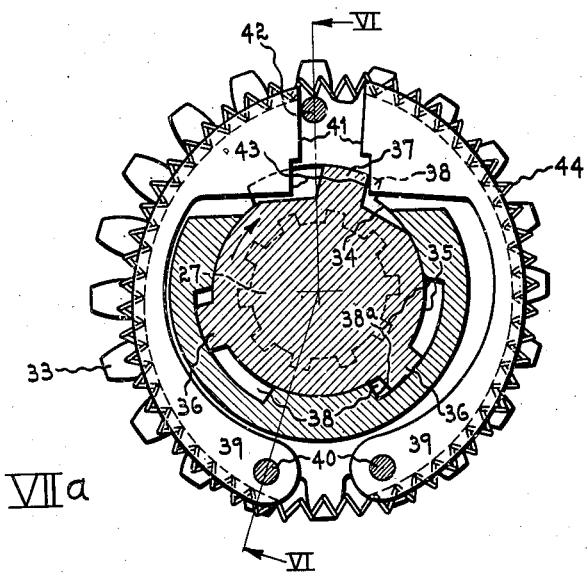
FIG. VIIa
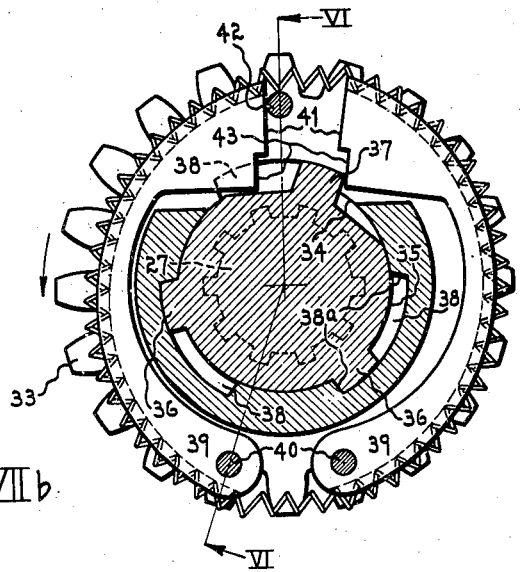
FIG. VIIb
INVENTORS.
WILLIAM F. GROENE
HAROLD J. SIEKMANN
BY William F. Groene
ATTORNEY

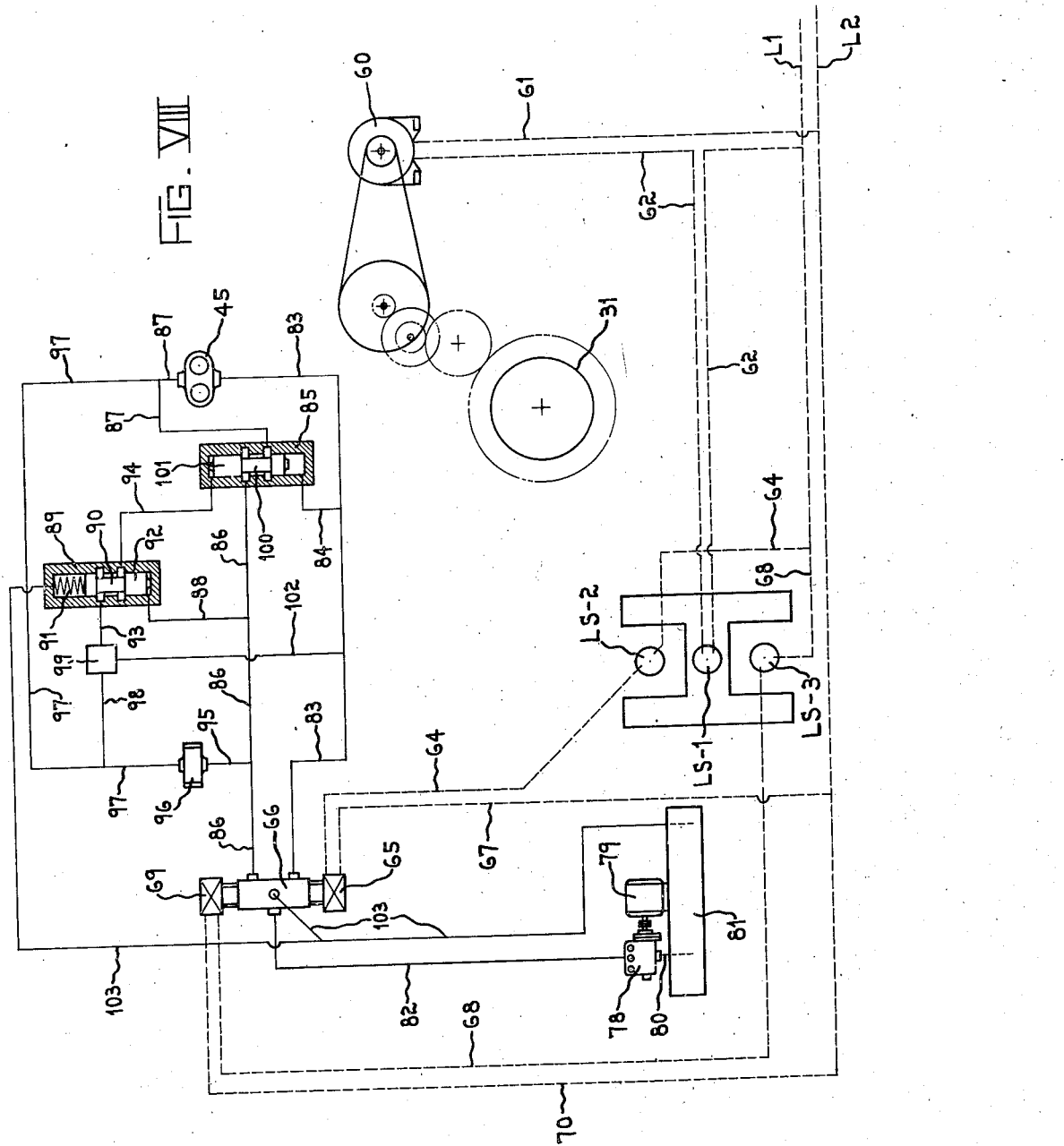

Patented Sept. 24, 1940

2,215,922

UNITED STATES PATENT OFFICE 2,215,922

POWER CHUCKING MECHANISM

William F. Groene and Harold J. Siekmann, Cincinnati, Ohio, assignors to The R. K. Le Blond Machine Tool Company, Cincinnati, Ohio, a corporation of Delaware Application October 6, 1939, Serial No. 298,230

21 Claims. (Cl. 82—1)

This invention pertains to power operating mechanism for chucking devices of machine tools. More particularly this device pertains to clamping and unclamping chucking devices of lathes by means of power. As an exemplary disclosure of this invention we show this power chucking device applied specifically to the problem of clamping and unclamping center drive chucking devices of a center drive lathe arranged for turning the line bearings of multi-throw crankshafts.

The operation of center drive chucks for clamping and unclamping work by means of power has long been a difficult problem because power to these devices because the nature of their ring gear construction precludes attaching any mechanical or fluid pressure power transmitting means to these ring gears permanently so that they may be satisfactorily operated from a position exterior of the ring gears.

Mechanical or fluid pressure devices all have inherent defects. When a source of electrical power is utilized it is necessary to use brushes and slip rings on the ring gears which mechanism is unsatisfactory because of the dirt and foreign matter getting on the slip ring surfaces destroying proper contact with the brushes during the rotation of the ring gears and cutting off metal from the work pieces gripped in them. When fluid pressure means are used it is found likewise impractical to apply fluid pressure because of the difficulty of providing a sufficiently fluid tight seal between the housings for the ring gears and the ring gears themselves for operating the fluid pressure chucking devices in the ring gears.

The object of the present invention, therefore, is to overcome these former difficulties while at the same time providing a rapid and efficient power chucking medium for the center drive chuck. We accomplish this result by providing a mechanism which is mounted on the frame of the lathe and which may be quickly actuated by a single control lever for effecting engagement of the power chucking device with the chuck and for rapidly actuating said power chucking device when so engaged with the chuck for clamping or unclamping work in said chuck.

Another object of this invention is to provide means for automatically positioning the clamping and unclamping device with relation to the chuck for rapid engagement of the device relative to the chuck at the completion of the cutting cycle.

Another object is to provide a device in which the movement of the tool feeding devices of lathe to which it is applied controls the accurate positioning of the clamping and unclamping device for the chuck at the completion of the cutting cycle.

A further object of this invention is to provide means in connection with the power clamping device to prevent rotation of the chucking devices by the main driving motor for rotating them when said device is engaged at any time with the chuck for actuating the clamping and unclamping mechanism of the chuck.

A further object is to provide a power clamping device for a chucking device for machine tools in which the chuck is tightened up with the application of relatively great power and which is unchucked initially by means of great power which is subsequently reduced to relatively little power at the completion of the unclamping cycle.

A further object of this invention is to provide a fluid pressure motor capable of exerting high torque for clamping and unclamping the work and which is instantly relieved of all power in either direction at the moment of stopping the clamping or unclamping process so as to relieve the transmission mechanism of the power clamping device from all strain to facilitate disengagement of the device under no load from the respective chuck being clamped.

A further object of this invention is to provide a spline and socket connection arrangement for engaging the device with a chucking device to be operated and to provide in connection with such an arrangement means providing floating movement in the spline driving shaft of said device to facilitate the engagement of it with the chucking socket of the chucking device to be operated.

Further features and advantages of this invention will appear from the following detailed description of the drawings in which:

Figure I is a front elevation of the power chucking device shown applied to a double center drive crankshaft lathe for operating the center drive chucking devices of the lathe.

Figure II is a right hand end elevation of the apparatus shown in Figure I.

Figure III is a vertical transverse section through the device on the line III—III of Figures I and V.

Figure IV is a vertical longitudinal section through the device on the line IV—IV of Figures II and IV.

Figure V is a horizontal longitudinal section through the device on the line V—V of Figures I, II, III and IV.

Figure VI is an enlarged longitudinal section through one of the driving ends of the device on the line VI—VI of Figures II and VII.

Figure VII is an enlarged transverse section through one of the driving ends of the device on the line VII—VII of Figure VI.

Figure VIIA is an enlarged transverse section through one of the driving ends of the device on the line VII—VII of Figure VI showing the result of the insertion of the splined end of the shafts in the sockets in the chuck when not in perfect alignment.

Figure VIIB is an enlarged transverse section through one of the driving ends of the device on the line VII—VII of Figure VI showing the position of the various parts when power is being applied to the chucking device when the splined shafts are inserted in the chuck sockets.

Figure VIII is a diagram showing the electric hydraulic control mechanism for operating the device.

This power chucking mechanism is shown applied to a double center drive crankshaft lathe of a character, for example, as shown in patents Re. 20,090, Re. 19,905, or 2,069,107 having the center drive ring gear housings 1 and 2 to which is bolted the supporting bracket 3 by means of suitable screws 4. In the bearings 5 formed in the bracket 3 is rotatably and slidably mounted the tubular member 6 to the outwardly projecting ends of which are fixed the downwardly extending gear casings 7 and 8. This tubular member may be shifted axially by means of the control lever 9 which is fixed in the yoke 10 journaled about the member 6 and axially confined thereon by the collars 11 and 12 fixed to the member 6 by pins 13 each side of the yoke. The extent of axial travel of the tubular member 6 is limited by the surfaces 14 and 15 in the H-slot plate 16 fixed to the brackets by screws 17 which are respectively engaged by the diameter 18 of the lever 9 as it is moved from right to left or vice versa.

Inside the tubular member 6 is the drive shaft 19 which is journaled on suitable bearings 20 and 21 (Figs. I and II) in the gear casings 7 and 8 respectively. Fixed on this shaft 19 in the casings 7 and 8 are the driving pinions 22 which drive the gears 23 journaled on suitable studs 24 carried by the gear casings. These gears 23 in turn drive gears 25 journaled on appropriate studs 26 carried by the gear casings. In the lower ends of these casings 7 and 8 (Fig. VI) are carried the socket engaging shafts 27 and 28 respectively on the ball bearings 29 which have suitable splined end portions 27a and 28a arranged to engage in the socket 30 of the clamping means of a center drive chuck 31 in the center drive housings 1 and 2 whereby rotation of this shaft 27 while engaged with said sockets 30 effects clamping or unclamping of the work W by the gripping means 32 of the chucks.

The shafts 27 and 28 are driven from the gears 25 which engage and drive the floating gears 33 (Fig. VII) having a bore 34 which is journaled on the diametral bearing surface 35 of the shafts 27 and 28. On the shafts are formed integral tongues 36 and 37 which project into relatively wide slots 38 formed in the bore 34 of the gears 33. By this arrangement the shafts 27 and 28 are provided with limited circumferential movement relative to their driving gears 33 while at the same time providing a positive drive for these shafts in either direction necessary for the proper operation of the clamping mechanism of the chucks 31.

In order to keep the tongues 36 and 37 substantially centralized in the slots 38 when the shafts 27 and 28 are withdrawn from the sockets 30 a pair of arcuate levers 39 (Fig. VII) are pivotally mounted on pins 40 fixed in the gear 33 and have contact surfaces 41 which normally rest against the stop pin 42 fixed in the gear 33, these levers 39 also having surfaces 43 engaging each side of the tongue 37. A peripheral band spring 44 passes around these levers and serves to automatically hold them in normal contact with the pin 42 and tongue 37 so that this tongue 37 and tongues 36 will lie substantially midway between the driving faces 38a of the slots 38.

When one of the shafts 27 is moved axially by means of the control lever 9 to engage its splined end 27a with the socket 30, it may be that the spline on the shaft does not register with the spline in the socket. Now, if the gear 33 were fixed on the shaft 27 the shaft could not rotate to bring the splined portions into proper register because of the gear train 25, 23, 22 and the shaft 19 could not be practically rotated by engagement of these splined portions to bring them in line. Thus great difficulty would be encountered in entering one or the other of the splined shafts 27 and 28 rapidly into the sockets 30 for the chucks 31. However, by floatingly mounting these shafts 27 and 28 as shown and described in Figures VI and VII, the light individual shafts on the anti-friction ball bearings 29 can be easily rotated to effect alignment of the splined portions with a very minimum of side pressure being exerted on the control lever 9 as the splined portions come into initial engagement.

In Figure VIIA is shown the relative movement effected in the shaft 27 or 28 as it is inserted in a chuck socket 30 when not in perfect alignment therewith. In this instance the shaft 27 is assumed to have been rotated clockwise by entering the splined socket 30 with the result that the right hand lever 39 is swung outwardly stretching the spring 44 by engagement of the tongue 37 with the surface 43 of this right hand lever 39. The gear 33 is, under this condition, not rotated and the left hand lever 39 is therefore held with its surface 41 against the pin 42 by the spring 44. The slots 38 are sufficiently wide to prevent engagement of the sides of the tongues 36 and 37 with the surface 38A during insertion of the shaft 27 in the socket even under the most mis-aligned condition, so that the shaft 27 may at all times be free to rotate for easy entrance into the socket.

In Figure VIIB is shown what takes place when power is applied to rotate the gear 33, counter-clockwise in this instance, after the shaft 27 has been inserted in a socket 30. The gear 33 rotates until the surfaces 38a of the slots 38 engage the tongues 36 and 37 whereupon the shaft 27 is positively driven for tightening or loosening the chuck socket 30. Meanwhile the right hand lever 39 is moved still further outwardly while the left hand lever remains against the pin 42.

After power is again disconnected from the gear 33 and the shaft 27 slid out of the socket 30, the spring pulling on the right hand lever 39 urges its surface 43 against the tongue 37 to rotate the shaft 27 (which is now free to rotate when removed from the socket 30) until the surface 41 of the right hand lever 39 engages the pin 41 to return the shaft 27 and gear 33 to the relationship shown in Figure VII. It is apparent that this action may take place for either direction of rotation of the shaft 27 when engaging a socket 30 and for either direction of rotation of the gear 33.

Power for driving these shafts 27 and 28 is derived from a motor 45, preferably a hydraulic fluid pressure motor carried on a suitable bracket 46 mounted on the frame 47 of the lathe. A suitable coupling 48 carried on the shaft 49 of the motor 45 has a splined bore 50 in which slidingly engages the splined end projection 19a of the shaft 19 so that this shaft may be driven in either of its axially shifted positions. Noting Fig. VII, when power is applied by the motor 45 with shaft 27 engaged in socket 30 of the chuck, the gear 33 will be rotated relative to the shaft 27 until its driving faces 38a engage the sides of the tongues 36 and 37 to effect positive driving of the shaft. During this relative rotation of the gear 33 and the shaft 27 the pin 42 in gear 33 carries one of the levers 39 away from contact of its face 43 with the side of the tongue 37 while the other lever is moved away from the pin 42 by engagement of the side of the tongue 37 with the surface 43 of this other lever thus stretching and expanding the spring 44. However, it is obvious that as soon as the load is released from the splined end 27a of the shaft 27 by removing it from the socket 30, the gear 33 and shaft 27 immediately return to the relative free floating position shown in Fig. VII ready for another insertion into socket 30.

Certain unique and vital features for the successful control and operation of this device will now be described. The control lever 9 effects the alternate engagement of one or the other of the shafts 27 and 28 in the sockets 30 of the chucks by horizontally moving it to one side or the other of the H-slot in the plate 16 engaging respectively the surfaces 14 and 15 in this plate. When the lever 9 is moved into the left side 51 of the H-slot the shaft 28 will engage in the socket 30 of the chuck 31 in housing 2 and when the lever 9 is moved into the right side 52 of the H-slot the shaft 27 will engage in the socket 30 of the chuck 31 in the housing 1. The application of power in either direction to either of the shafts 27 and 28 is also completely controlled by manipulating the lever 9 vertically when in either of the H-slot positions 51 and 52.

Noting particularly Figures III, IV, and V, the control lever 9 is automatically located and held in the neutral position intermediate the slots 51 and 52 of the H-slot by detent means comprising the lever 53 pivotally mounted on a pin 54 carried in the bracket 3. A spring urged plunger 55 engages the outer end of this lever 53 to cause its projection 56 to be forced against the yoke 10 and into the detent slot 57 formed in it. Thus detent means serve to position the control lever horizontally (Figure I) for positioning both of the splined drive shafts 27 and 28 when disengaged from the chucking devices. It is also to be noted that the sides 58 and 59 of the cross slot of the H-slot prevents rotation of these shafts 27 and 28 since the control lever 9 cannot be removed vertically when in this position.

In order to prevent damage to this device means are provided to prevent rotation of the chucks 31 by the main drive motor 60, Figure VIII, when either of the splined drive shafts 27 and 28 are engaged with the sockets 30 of the chucks 31. Electrical power for operating the main drive motor 60 is derived from the power lines L1 and L2, line L2 being directly connected to the motor through appropriate electrical control mechanism indicated diagrammatically as 61. Connected in series in the line 62 which connects line L1 to the motor 60, is the normally closed limit switch LS—1 carried in the bracket 3. On the detent lever 53 is a projection 63 which is arranged to engage and operate this limit switch LS—1 to open it when the lever 9 is moved to either position 51 or 52 of the H-slot. This is caused by the projection 56 riding up out of the notch 57 of the yoke 10 when lever 9 is so moved thus swinging lever 53 clockwise (Figure V) to open the limit switch LS—1 preventing operation of the main drive motor 60.

The control of the motor for driving the splined shafts 27 and 28 by vertical movement of the control lever 9 when in positions 51 or 52 of the H-slot will now be described. Mounted on the bracket 3 is the normally open "clamp" limit switch LS—2 and the normally open "unclamp" limit switch LS—3. Limit switch LS—2 is connected in series in the line 64 which connects line L1 to the "clamp" solenoid 65 of control valve 66 which in turn is suitably connected by appropriate electrical control means in line 67 to line L2. Similarly limit switch LS—3 is connected in series in line 68 connecting line L1 to the "unclamp" solenoid 69 of the control valve 66. The solenoid 69 is connected through appropriate electrical control means in line 70. On the yoke 10 are formed the integral lugs 71, 72, 73, and 74 (Figure IV), the lugs 71 and 74 engaging respectively the limit switches LS—2 and LS—3 when the control lever 9 is moved up and down while in position 52 of the H-slot. Lugs 72 and 73 similarly engage respectively these limit switches LS—2 and LS—3 when the control lever 9 is moved up and down while in position 51 of the H-slot. In order to automatically control the vertical movement of the lever 9 to keep its portion 18 normally aligned with the sides 58 and 59 of the cross slot of the H-slot, a pair of spring urged plungers 75 are mounted in the bracket 3 to simultaneously engage stop pins 76 carried in said bracket and abutment surfaces 77 on the yoke 10.

The operation of this device is substantially as follows: When work is to be loaded in the chucking devices 31 while the chucks are unclamped, the control lever 9 is positioned as shown best in Fig. I, being in the neutral position in the cross slot of the H-slot in the plate 16. After work has been properly positioned in these chucking devices preparatory to clamping, the control handle lever 9 is moved first to position 52 of the H-slot whereupon the spline shaft 27 enters the socket 30 of the chucking device in the housing 1. The handle lever 9 is then moved downwardly in the slot 52 whereupon the projection 74 will be aligned with the limit switch LS—3 and by pulling down on the lever 9 will be swung into engagement with this limit switch to actuate it so as to effect operation of the solenoid 69 of the control valve 66. As soon as this solenoid 69 of control valve 66 is so energized fluid pressure from a fluid pressure pump 78 driven by suitable electric motor 79 delivers fluid through the line 80 from a fluid reservoir 81 through line 82 to this control valve 66 and then through the line 83 to the fluid pressure motor 45. This pressure is delivered at the maximum pressure of the fluid pressure pump 78 so as to operate the fluid pressure motor 45 at high pressure to securely bind the gripping devices 32 of the chuck devices 31 tightly on the work W. During this operation of the hydraulic motor 45 pressure is also delivered through the line 84 to the two-positioned shuttle valve 85, Fig. VIII, to move its plunger to the position shown in this figure. Thus the chucking mechanism in the chucking device in housing 1 is operated to clamp up the work. Similarly, when it is desired to effect clamping of the chucking device 31 in the housing 2 the control lever 9 is moved to the left, Figure I, into the slot 51 so as to engage the spline driving shaft 28 with the socket of this chuck. The control lever 9 is again moved downwardly while in the slot 51 whereupon the projection 73 is caused to engage the limit switch LS—3 which again energizes the solenoid 69 of the control valve 66 so as to effect operation of the device to tighten this chuck by operation of the motor 45 as described in the case of tightening the chuck in housing No. 1. It is to be noted that the control valve 66 when neither of its solenoids 65 are operated automatically centers itself to shut off all fluid pressure from escaping from the line 82.

After having thus properly clamped up the work W in both chucking devices the lever 9 is again moved to the neutral position in the cross slot of the H-slot. This permits the detent lever 53, Figure V, to again enter the slot 57 of the yoke 10 of the lever 9 so as to render the limit switch LS—1 operative to permit the main drive motor 60 for driving the ring gear chucking devices 31 to become operative for rotating them during the cutting cycle of the lathe.

At the completion of this cutting cycle when it is again desired to again unchuck the work and remove it from the lathe, the lever 9 may be moved to one or the other of the slots 51 and 52, for example moved to the slot 51 to engage the splined driving shaft 28 with the socket 30 of the chuck in the housing 2 and then moved upwardly. This brings the projection 72 in alignment with the limit switch LS—2 and the upward movement of the lever 9 causes it to engage this limit switch to operate it whereupon the solenoid 65 of the control valve 66 is energized whereupon fluid pressure from the line 82 then enters the line 86 and passes through this line through the valve 85 which has its plungers previously positioned as shown in Figure VIII by the chucking operation just described and passes out through this valve 85 to the line 87 to cause the fluid pressure motor 45 to operate in the reverse direction to unclamp the device. Because of the necessarily high pressure necessary to unclamp the work from the chucking devices which have already been rigidly clamped during the clamping operation, high pressure will build up during this initial stage of this unclamping in the line 88 to the line 86 and to the spring urged shuttle valve 89 causing its plunger 90 to move against the spring 91 so that its portion 92 will automatically close off connections between lines 93 and 94. Fluid pressure from the line 86 may also proceed to the hydraulic motor 45 at this time by proceeding through line 95 pressure control valve 96 line 97 into line 87 so that fluid pressure will not escape from line 87 to lines just mentioned to prevent the building up of pressure in line 87 for the hydraulic motor to unclamp the chucking devices.

As soon as the initial unclamping has been effected so that the resistance required to initially unclamp the chucking devices has been removed, pressure in line 88 immediately drops permitting the plunger 90 of the valve 89 to automatically return to the position shown in Figure VIII under the influence of the spring 91. The result of this action is that the fluid pressure from line 86 then proceeds through line 95 in the pressure reducing valve 96 into the line 97 at a relatively low pressure. However, pressure does not drop immediately in line 97 because it can not escape immediately through 98 into line 93 because of a time delay valve 99 which momentarily prevents passage of the fluid between these lines 98 and 93 for a limited period of time after pressure has dropped in line 88, the object of this arrangement being to make sure that the fluid pressure braking motor will be operated sufficiently long at high pressure to permit the complete withdrawal of the chucking members from the work before reducing the unclamping pressure to a relatively low amount. However, after a period of time fluid pressure is permitted to pass between lines 98 and 93 and thus through line 89 into line 94 whereupon valve 85 is actuated to move its plunger 100 so that portion 101 will close off fluid pressure from line 86 to line 87 so that high pressure may no longer be delivered to line 86 to line 87 and the fluid pressure motor 45 which would immediately build, in the event, an obstruction to be engaged such as the stop for the outer position of the chuck jaws 32. If this high pressure was maintained when such jaws did hit their unchucked position considerable damage and warpage of the chucking ring gears might result and also unnecessary strain placed on the chucking mechanism. Thus after the plunger 100 has been so shifted, fluid pressure then proceeds through the pressure reducing valve at considerably reduced pressure through line 97 to line 87 to operate the fluid pressure motor 45 for the remainder of the operation of moving the clamping devices 32 to the fully removed position at a reduced pressure so that when they do finally hit their withdrawn stops in the ring gear chuck no excessive damage or strain will be placed on the chucking mechanism. The lever 9 is then released and allowed to automatically come to its central position effected by the detent plungers 75 as described.

The lever 9 is then moved to the slot 52 whereupon the splined driving shaft is engaged with the socket 30 and the chuck 31 of the housing 1 and the lever again moved upwardly in this slot 52 to effect unclamping of this chucking device as described.

The lines 102, 103 function as drain lines for the respective valves 99 and 89 and also for the control valve 66 during operation of the mechanism as described, the line 83 acting as a drain line during the unchucking operation while the line 86 acts as a drain line during the clamping operation. Thus summarizing the function of the hydraulic clamping motor 45; when the chucking devices are to be clamped the hydraulic motor is operated at full high pressure to immediately tighten up the chuck jaws at full high pressure. During the unclamping operation the fluid pressure motor is initially operated at relatively high pressure to positively withdraw the clamping devices from work gripped in the chuck and then as soon as this initial unclamping has been effected pressure is automatically reduced after a period of time during the final stages of moving the gripping devices back to their fully withdrawn position. The clamping devices are finally engaging their withdrawn stops at relatively low pressure prior to the hydraulic motor 45 so that they are fully withdrawn against the ring gears and chucking devices in such a way as not to develop excessive strain in the mechanism when coming to rest in their withdrawn position.

Another feature in connection with this unique power wrench for operating chucking devices is that shown better in Figure II. While the device may be normally operated with the spline driving shaft 27 and 28 fixed relative to the chucking devices so that when the chucks are stopped the sockets 30 will automatically come in proper alignment with these shafts. It is also an object of our invention to provide an arrangement wherein these shafts 27 and 28 may be moved transversely so as to move them out of aligned position with said sockets when the chucks are so stopped. Noting Figure II this is best shown the object of moving these devices in this manner to provide access of the cutting tool to the work piece without interfering with the clamping device while at the same time permitting it to be automatically realigned with the chucking devices at the completion of the cutting cycle when the tools are withdrawn from the work being turned. In Figure II it will be noted that on the gear casing 8 is provided an abutment surface 104 which is normally engaged against a portion 105 of a tool feeding mechanism 106 of the lathe by means of the spring 107 which is connected to the stud 24 of the gear casing and fixed to the machine frame 47 by suitable fastening means 48. These surfaces 105 are so arranged that as the tool feeding device 106 feeds down to the position 106a the gear casings 7 and 8 being connected together on the tube 6 will be swung to the position indicated at 8a thereby automatically moving the power wrench device out of the way of the cutting tools 108 as they proceed down to position 108a to machine the various bearing portions 109 on the work W. It will also be noted that the spring 107 automatically returns the gear casings 7 and 8, and, therefore, the shafts 27 and 28 to proper aligned position with the socket 30 when the tool feeding devices 106 again move back to their fully withdrawn position as shown in Figure II. By this arrangement it is possible to effect the clamping of the chucking devices while the tools are in their withdrawn position while at the same time permitting the tools to feed down close to the work and pass the various sockets of the chucking devices without interference of the power clamping mechanism. And also the arrangement is so provided that the device is automatically located, ready for the power clamping or unclamping of the chucks when the tools withdraw again to their retracted position.

Having thus fully set forth and described our invention what we claim as new and desire to secure by U. S. Letters Patent is:

1. In a power chucking device for a lathe, power transmission mechanism movably mounted on the frame of said lathe, means for connecting or disconnecting said transmission to a chuck of said lathe by moving it on said frame, a fluid pressure motor for actuating said transmission to effect clamping or unclamping of said chuck, a source of high fluid pressure for operating said motor, a fluid pressure control means for connecting said source of high fluid pressure to said motor to clamp said chuck and to initially unclamp said chuck, a pressure reducing means, and means whereby said control means connects said source of fluid pressure through said pressure reducing means to said motor under high pressure, to complete said unclamping under low pressure.

2. In a power chucking device for a lathe, power transmission mechanism movably mounted on the frame of said lathe, means for connecting or disconnecting said transmission to a chuck of said lathe by moving it on said frame, a fluid pressure motor for actuating said transmission to effect clamping or unclamping of said chuck when said transmission is engaged with said chuck, a main driving motor for rotating said chuck of said lathe, a means operable by the movement of said transmission on said frame to prevent operation of said main driving motor when said transmission is engaged with said chuck.

3. In a power wrench, a power transmission mechanism, means for connecting or disconnecting said transmission with respect to a member to be tightened or loosened, power means for rotating said transmission in either direction, and control means for said power means to completely relieve it from all driving force at the completion of the tightening or loosening operations to permit free rotation of said transmission.

4. In a power wrench, a power transmission mechanism, means for connecting or disconnecting said transmission with respect to a member to be tightened or loosened, power means for rotating said transmission in either direction, and means permitting limited relative movement between said first mentioned means and said transmission to facilitate engagement of this means with the member to be tightened or loosened.

5. In a machine tool, a frame, a work spindle journaled in said frame, a chuck on said spindle, power operating mechanism for said chuck comprising a bracket fixed on said frame, a gear casing movable on said bracket relative to said chuck, power transmission mechanism in said casing arranged to be connected to the clamping mechanism of said chuck upon movement of said gear casing, and a fluid pressure means on said frame for driving said transmission.

6. In a machine tool, a frame, a work spindle journaled in said frame, a chuck on said spindle, power operating mechanism for said chuck comprising a bracket fixed on said frame, a gear casing movable on said bracket parallel with the axis of said work spindle relative to said chuck, power transmission mechanism in said casing arranged to be connected to the clamping mechanism of said chuck upon movement of said gear casing and fluid pressure means on said frame for driving said transmission.

7. In a machine tool, a frame, a work spindle journaled in said frame, a chuck on said spindle, power operating mechanism for said chuck comprising a bracket fixed on said frame, a gear casing movable on said bracket parallel with the axis of said work spindle relative to said chuck, power transmission mechanism in said casing, chuck engaging means in said casing driven by said transmission, means in said chuck to receive said chuck engaging means, means for arresting rotation of said spindle at a predetermined position so as to bring said chuck engaging and receiving means in alignment, means for effecting movement of said casing to effect engagement of said engaging and receiving means, and fluid-pressure means on said frame for driving said transmission.

8. In a machine tool, a frame, a work spindle journaled in said frame, a chuck on said spindle, power operating mechanism for said chuck comprising a bracket fixed on said frame, a gear casing movable on said bracket parallel with the axis of said work spindle relative to said chuck, power transmission mechanism in said casing, chuck engaging means in said casing driven by said transmission, means in said chuck to receive said chuck engaging means, means for arresting rotation of said spindle at a predetermined position so as to bring said chuck engaging and receiving means in alignment, fluid pressure means on said frame for driving said transmission, means for effecting movement of said casing to cause engagement of said engaging and receiving means, and means for rendering said fluid pressure means operative when said engaging and receiving means are engaged.

9. In a machine tool, a frame, a work spindle journaled in said frame, a chuck on said spindle, a tool feeding device associated with said chuck, a bracket fixed on said frame, a gear casing movable on said bracket parallel with the axis of said work spindle relative to said chuck, power transmission mechanism in said casing, chuck engaging means in said casing driven by said transmission, means in said chuck to receive said chuck engaging means, driving means for said work spindle, means for arresting rotation of said spindle at a predetermined position so as to bring said chuck engaging and receiving means in alignment, fluid pressure means for driving said transmission, means for effecting movement of said casing to cause engagement of said engaging and receiving means, means operative by the movement of said casing to render said driving means for said work spindle inoperative when said engaging and receiving means are engaged, and means for rendering said fluid pressure means operative when said engaging and receiving means are engaged.

10. In a machine tool, a frame, a work spindle journaled in said frame, a chuck on said spindle, a tool feeding device associated with said chuck, a bracket fixed on said frame, a gear casing movable on said bracket parallel with the axis of said work spindle relative to said chuck power transmission mechanism in said casing, chuck engaging means in said casing driven by said transmission, means in said chuck to receive said chuck engaging means, means for moving said chuck engaging means perpendicular to said first mentioned direction of movement, means for effecting said perpendicular movement by the movement of said tool feeding device, driving means for said work spindle, and fluid pressure means for driving said transmisison.

11. In a machine tool, a frame, a work spindle journaled in said frame, a chuck on said spindle, a tool feeding device associated with said chuck, a bracket fixed on said frame, a gear casing movable on said bracket parallel with the axis of said work spindle relative to said chuck power transmission mechanism in said casing, chuck engaging means in said casing driven by said transmission, means in said chuck to receive said chuck engaging means, means for moving said chuck engaging means perpendicular to said first mentioned direction of movement, means for effecting said perpendicular movement by the movement of said tool feeding device, driving means for said work spindle, means for arresting rotation of said spindle at a predetermined position so as to bring said chuck engaging and receiving means in alignment when said tool feeding device is retracted from said chuck, fluid pressure means for driving said transmission, means for effecting movement of said casing to cause engagement of said engaging and receiving means when so aligned, means operative by the movement of said casing to render said driving means for said work spindle inoperative when said engaging and receiving means are engaged, and means for rendering said fluid pressure means operative when said engaging and receiving means are engaged.

12. In a center drive lathe, a frame, a pair of center drive housings mounted in said frame, chucks rotatably mounted in said housings, driving means for rotating said chucks, a bracket mounted on said housings, a tubular member rotatably and slidably mounted in said bracket parallel with the axis of said chucks, gear casings fixed on each end of said tubular member extending radially toward the axis of said chucks, a power shaft journaled in said tubular member, power means for driving said shaft, chuck engaging shafts journaled in said casings, transmission mechanism connecting said power shaft with said chuck engaging shafts, and means associated with said chuck shafts permitting limited relative rotation between said shafts and said transmission mechanism while providing a positive driving connection between said shafts and the transmission mechanism.

13. In a center drive lathe, a frame, a pair of center drive housings mounted in said frame, chucks rotatably mounted in said housings, driving means for rotating said chucks, a bracket mounted on said housings, a tubular member rotatably and slidably mounted in said bracket parallel with the axis of said chucks, gear casings fixed on each end of said tubular member extending radially toward the axis of said chucks, a power shaft journaled in said tubular member, power means for driving said shaft, chuck engaging shafts journaled in said casings, transmission mechanism connecting said power shaft with said chuck engaging shafts, a control lever journaled on but confined against axial movement on said tubular member, an H-slot arrangement associated with said lever for limiting the movements of said lever to horizontal movements for effecting engagement of one or the other of said chuck engaging shafts with one or the other of said chucks for operating the clamping or unclamping means thereof and to vertical movements for effecting operation of the power means for rotating said chuck engaging shafts in either direction.

14. In a center drive lathe, a frame, a pair of center drive housings mounted in said frame, chucks rotatably mounted in said housings, driving means for rotating said chucks, a bracket mounted on said housings, a tubular member rotatably and slidably mounted in said bracket parallel with the axis of said chucks, gear casings fixed on each end of said tubular member extending radially toward the axis of said chucks, a power shaft journaled in said tubular member, power means for driving said shaft, chuck engaging shafts journaled in said casings, transmission mechanism connecting said power shaft with said chuck engaging shafts, a control lever journaled on but confined against axial movement on said tubular member so that horizontal movements of said lever effects engagement of said chuck engaging shafts with said chucks for operating the clamping or unclamping means thereof and so that vertical movements of said lever effects operation of the power means for rotating said chuck engaging shaft.

15. In a center drive lathe, a frame, a pair of center drive housings mounted in said frame, chucks rotatably mounted in said housings, driving means for rotating said chucks, a bracket mounted on said housings, a tubular member rotatably and slidably mounted in said bracket parallel with the axis of said chucks, gear casings fixed on each end of said tubular members extending radially toward the axis of said chucks, a power shaft journaled in said tubular member, power means for driving said shaft, chuck engaging shafts journaled in said casings, transmission mechanism connecting said power shaft with said chuck engaging shafts, a control lever journaled on but confined against axial movement on said tubular member, an H-slot arrangement associated with said lever, a horizontal cross slot in said H-slot to limit movement of said lever for axial sliding of said tubular member to effect engagement of one or the other of said chuck engaging shafts with said chucks, a pair of spaced vertical slots of said H-slot connected to the ends of said cross slot in which said lever may be raised or lowered, and projections on said lever arranged to engage control means for energizing said power means for driving said chuck engaging shafts when said lever is in raised or lowered position in one or the other of said pair of vertical slots.

16. In a center drive lathe, a frame, a pair of center drive housings mounted in said frame, chucks rotatably mounted in said housings, driving means for rotating said chucks, a bracket mounted on said housings, a tubular member rotatably and slidably mounted in said bracket parallel with the axis of said chucks, gear casings fixed on each end of said tubular member extending radially toward the axis of said chucks, a power shaft journaled in said tubular member, power means for driving said shaft, chuck engaging shafts journaled in said casings, transmission mechanism connecting said power shaft with said chuck engaging shafts, a control lever journaled on but confined against axial movement on said tubular member, an H-slot arrangement associated with said lever, a horizontal cross slot in said H-slot to limit movement of said lever for axial sliding of said tubular member to effect engagement of one or the other of said chuck engaging shafts with said chucks, a pair of spaced vertical slots of said H-slot connected to the ends of said cross slot in which said lever may be raised or lowered, a pair of normally open limit switches mounted on said bracket, spaced pairs of projections on said lever arranged to engage and close said limit switches when said lever is in raised or lowered position in one or the other of said pair of vertical slots, a source of power for actuating said power means for driving said chuck engaging shafts, and control means operated by said limit switches to apply said source of power to said power means.

17. In a center drive lathe, a frame, a pair of center drive housings mounted in said frame, chucks rotatably mounted in said housings, driving means for rotating said chucks, a bracket mounted on said housings, a tubular member rotatably and slidably mounted in said bracket parallel with the axis of said chucks, gear casings fixed on each end of said tubular member extending radially toward the axis of said chucks, a power shaft journaled in said tubular member, power means for driving said shaft, chuck engaging shafts journaled in said casings, transmission mechanism connecting said power shaft with said chuck engaging shafts, a control lever journaled on but confined against axial movement on said tubular member, an H-slot arrangement associated with said lever, a horizontal cross slot in said H-slot to limit movement of said lever for axial sliding of said tubular member to effect engagement of one or the other of said chuck engaging shafts with said chucks, a pair of spaced vertical slots of said H-slot connected to the ends of said cross slot in which said lever may be raised or lowered, a pair of normally open limit switches mounted on said bracket, spaced pairs of projections on said lever arranged to engage and close said limit switches when said lever is in raised or lowered position in one or the other of said pair of vertical slots, a source of power for actuating said power means for driving said chuck engaging shafts, control means operated by said limit switches to apply said source of power to said power means, a third normally closed limit switch mounted on said bracket, a projection on said lever arranged to open said third limit switch when said lever is moved into either of said vertical slots, a source of power for operating said driving means for rotating said chucks, and control means operated by said third limit switch to apply said source of power to said driying means.

18. In a power wrench device, means for engaging a member to be tightened or loosened, a fluid pressure motor for driving said engaging means, a source of relatively high fluid pressure, a control valve connected between said source of fluid pressure and said motor, means for actuating said valve so as to direct said fluid pressure to one side or the other of said motor to cause it to rotate in different directions, said valve being arranged for a neutral position at which time fluid pessure is cut off from said motor while said connections from said valve to said motor are opened to a drain line so as to permit free rotation of said motor by said engaging means when said valve is in said neutral position.

19. In a power wrench device, means for engaging a member to be tightened or loosened, a fluid pressure motor for driving said engaging means, a source of relatively high fluid pressure, a control valve connected between said source of fluid pressure and said motor, having a supply line from said source of fluid pressure and a drain line and a pair of lines connected to each side of said fluid pressure motor, and means for actuating said valve so as to connect said supply line to one or the other of said pair of lines while said drain line is connected to the opposite of said pair of lines.

20. In a power wrench device, means for engaging a member to be tightened or loosened, a fluid pressure motor for driving said engaging means, a source of relatively high fluid pressure, a control valve connected between said source of fluid pressure and said motor, having a supply line from said source of fluid pressure and a drain line and a pair of lines connected to each side of said fluid pressure motor, means for actuating said valve so as to connect said supply line to one or the other of said pair of lines while said drain line is connected to the opposite of said pair of lines, and pressure reducing means in one of said pair of lines to effect operation of said motor at reduced pressure in one direction.

21. In a power wrench device, means for engaging a member to be tightened or loosened, a fluid pressure motor for driving said engaging means, a source of relatively high fluid pressure, a control valve connected between said source of fluid pressure and said motor, having a supply line from said source of fluid pressure and a drain line and a pair of lines connected to each side of said fluid pressure motor, means for actuating said valve so as to connect said supply line to one or the other of said pair of lines while said drain line is connected to the opposite of said pair of lines, pressure reducing means in one of said pair of lines to effect operation of said motor at reduced pressure in one direction, and time delay mechanism associated with said pressure reducing means to prevent immediate operation of said reducing means when said control valve is operated to connect said supply line to the line containing said pressure reducing means.

WILLIAM F. GROENE.
HAROLD J. SIEKMANN.